(12) United States Patent
Randall et al.

(10) Patent No.: US 8,374,084 B2
(45) Date of Patent: Feb. 12, 2013

(54) PACKET SCHEDULING

(75) Inventors: David Randall, Romsey (GB); Thomas Stadler, Vienna (AT); Burghard Unteregger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 206 days.

(21) Appl. No.: 12/311,577

(22) PCT Filed: Oct. 3, 2007

(86) PCT No.: PCT/GB2007/050608
§ 371 (c)(1),
(2), (4) Date: Oct. 27, 2009

(87) PCT Pub. No.: WO2008/041032
PCT Pub. Date: Apr. 10, 2008

(65) Prior Publication Data
US 2010/0098003 A1    Apr. 22, 2010

(30) Foreign Application Priority Data

Oct. 4, 2006    (GB) ................................. 0619519.2
Oct. 26, 2006   (GB) ................................. 0621243.5

(51) Int. Cl.
*H04J 1/16*    (2006.01)
(52) U.S. Cl. ....................................... 370/230
(58) Field of Classification Search ....... 370/395.4–412, 370/229–236, 321–326
See application file for complete search history.

(56) References Cited

U.S. PATENT DOCUMENTS

| | | | | |
|---|---|---|---|---|
| 6,047,000 A * | 4/2000 | Tsang et al. | ................... | 370/412 |
| 6,370,163 B1 * | 4/2002 | Shaffer et al. | ................. | 370/519 |
| 6,646,986 B1 * | 11/2003 | Beshai | ........................ | 370/230.1 |
| 6,728,257 B1 * | 4/2004 | Bharghavan et al. | ......... | 370/458 |
| 6,914,881 B1 * | 7/2005 | Mansfield et al. | ......... | 370/230 |
| 7,298,719 B2 * | 11/2007 | Andrews et al. | ............. | 370/329 |
| 7,477,609 B2 * | 1/2009 | Agin | ............................ | 370/252 |
| 7,746,777 B2 * | 6/2010 | Brown et al. | ............... | 370/230.1 |
| 8,031,655 B2 * | 10/2011 | Ye et al. | ........................ | 370/328 |
| 8,031,660 B2 * | 10/2011 | Lenzini et al. | ................ | 370/329 |
| 2002/0039351 A1 | 4/2002 | Wang et al. | | |
| 2002/0136200 A1 * | 9/2002 | St. John | ........................ | 370/352 |
| 2003/0048805 A1 * | 3/2003 | Yoshihara et al. | ............ | 370/468 |
| 2003/0072317 A1 * | 4/2003 | Yuang et al. | .................. | 370/412 |

(Continued)

FOREIGN PATENT DOCUMENTS

| CN | 1359219 A | 7/2002 |
|---|---|---|
| WO | 01/63857 A1 | 8/2001 |

(Continued)

OTHER PUBLICATIONS

International Search Report for PCT/B2007/050608 mailed Apr. 24, 2008.

*Primary Examiner* — Andrew Lai
*Assistant Examiner* — Juvena Loo
(74) *Attorney, Agent, or Firm* — Staas & Halsey LLP

(57) ABSTRACT

A method of scheduling packets in a mobile communication system includes, in each time period, assigning to each bearer of a terminal, a credit. In each time period for which resources are available, accepting data packets from a bearer in accordance with predefined constraints of priority, buffer content and credit. An accepted data packet size may exceed the available credit by an amount in a predefined range.

18 Claims, 2 Drawing Sheets

U.S. PATENT DOCUMENTS

| | | |
|---|---|---|
| 2003/0103514 A1* | 6/2003 | Nam et al. .................... 370/412 |
| 2003/0118044 A1 | 6/2003 | Blanc et al. |
| 2004/0057459 A1* | 3/2004 | Sharony et al. ............... 370/468 |
| 2004/0090974 A1* | 5/2004 | Balakrishnan et al. ....... 370/412 |
| 2004/0120258 A1* | 6/2004 | Mattila ......................... 370/239 |
| 2004/0213276 A1* | 10/2004 | Yamada ........................ 370/412 |
| 2004/0260829 A1* | 12/2004 | Husak et al. ................. 709/232 |
| 2005/0259578 A1* | 11/2005 | Shinagawa et al. ........... 370/230 |
| 2006/0050723 A1* | 3/2006 | Yu ................................ 370/412 |
| 2007/0076613 A1* | 4/2007 | Malhotra et al. ........... 370/235.1 |
| 2007/0104210 A1* | 5/2007 | Wu et al. ....................... 370/412 |
| 2007/0115817 A1* | 5/2007 | Gupta et al. .................. 370/230 |
| 2008/0233964 A1* | 9/2008 | McCoy et al. ................ 455/450 |
| 2008/0298337 A1* | 12/2008 | Rezaei et al. ................. 370/345 |

FOREIGN PATENT DOCUMENTS

WO      2006/035408 A1     4/2006

* cited by examiner

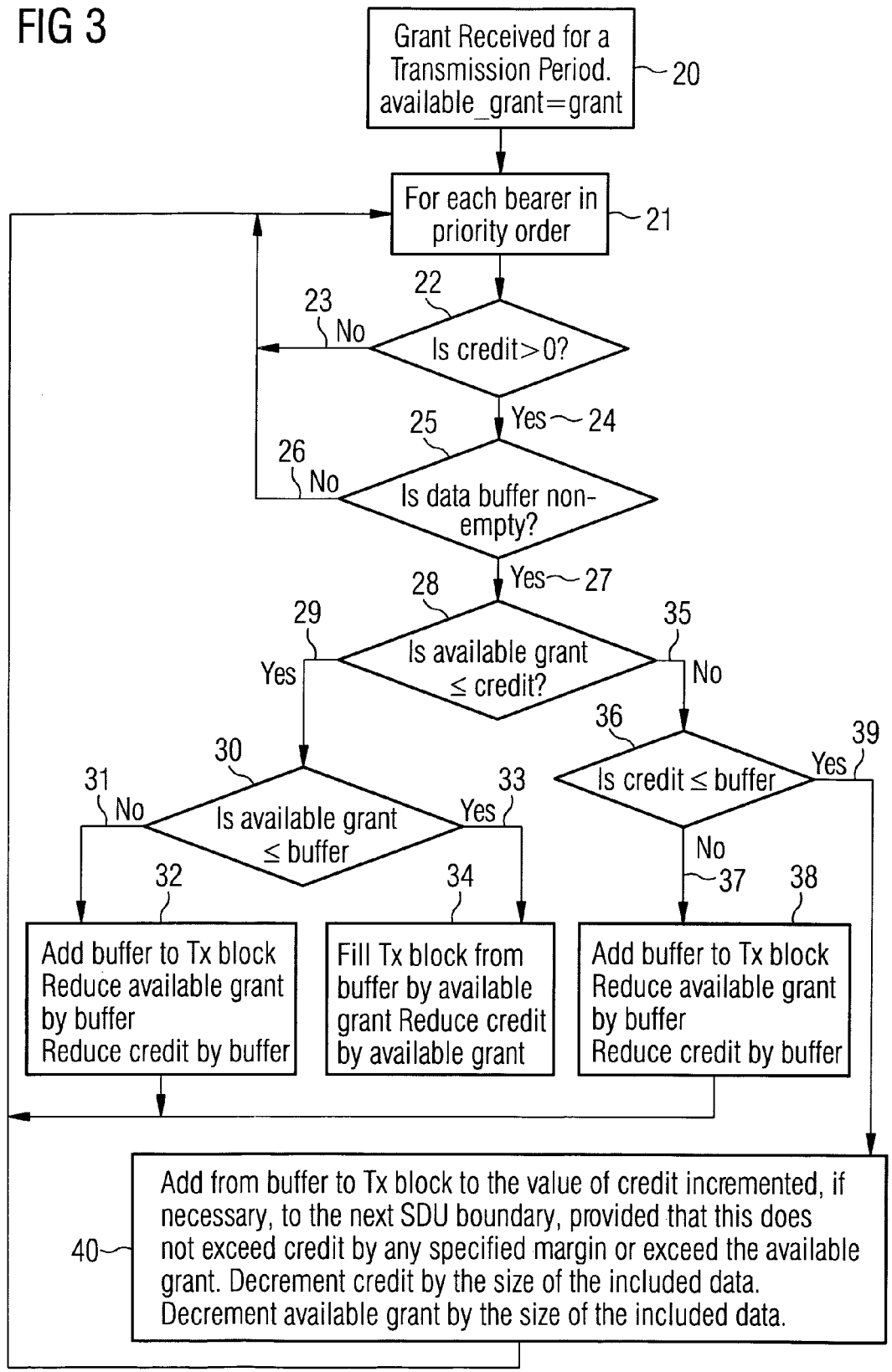

PACKET SCHEDULING

CROSS REFERENCE TO RELATED APPLICATIONS

This application is the U.S. national stage of International Application No. PCT/GB2007/050608, filed Oct. 3, 2007 and claims the benefit thereof. The International Application claims the benefits of United Kingdom Application No. 0619519.2 filed on Oct. 4, 2006 and United Kingdom Application No. 0621243.5 filed Oct. 26, 2006. All three applications are incorporated by reference herein in their entirety.

BACKGROUND

Described below is a method of scheduling of packets in a mobile communication system.

In mobile radio systems, where dynamic assignment of radio capacity amongst user equipments (UEs) operates in the uplink, for example universal mobile telecommunication system (UMTS) enhanced uplink dedicated channel (E-DCH) transmission, for efficiency reasons, radio resources that are to be used within a time period can be assigned on a UE basis, rather than on the basis of the individual bearers that a UE is using to transmit data. This then requires that the UE apply a rule regarding how much capacity is assigned to each bearer within the time period, for example, between bearers assigned to signalling, speech and best effort data services.

For UMTS E-DCH the rule that has been used is the following. For each transmission opportunity, i.e. transmission time interval (TTI), the scheduler allocates capacity to the highest priority bearer that has a non-empty transmission buffer. The principle is highest priority first, but unfortunately, at times of high cell load, when the UE may not be assigned all of the capacity that the data buffered for all bearers requires, this can lead to starvation of the lower priority bearers.

For UMTS long term evolution (LTE) uplink transmission there is a desire that starvation be avoided and greater flexibility in resource assignment between bearers be possible, whilst retaining the per UE, rather than per UE bearer, resource allocation.

One proposal for assigning capacity has been to assign resources to each bearer, in priority order, until each has received an allocation equivalent to the minimum data rate for that bearer, after which any additional capacity is assigned to bearers in, for example, priority order.

SUMMARY

In accordance with a first aspect, a method of scheduling packets in a mobile communication system includes, in each time period, assigning to each bearer of a terminal, a credit; in each time period for which resources are available; and accepting data packets from a bearer in accordance with predefined constraints of priority, buffer content and credit; wherein an accepted data packet size may exceed the available credit by an amount in a predefined range.

In the method, a credit is held allowing maximization of size of a packet that is sent to reduce segmentation, so whole service data units are transmitted, thereby avoiding unnecessary segmentation. The use of a credit allows transmission of a whole packet, where normally there would only be permission for transmitting a part of the packet.

The constraints of priority, buffer content and credit may be for the highest priority, non-empty buffer and positive credit.

If the bearer satisfies the constraints, the content of the buffer may be added to a data block for transmission to the limit of the credit, or of the next service data unit boundary.

The predefined range may be set to accommodate un-segmented packets.

Any amount by which the credit is exceeded may be carried forward to the next time interval as a negative credit.

Any amount by which the credit is unused may be carried forward to the next time interval as a positive credit.

An upper limit of carried forward positive or negative credit may be set.

The method may be subject to the proviso that the credit is not exceeded by more than a set margin, and also that the whole SDU fits within the transport block that is transmitted and equal in size to the grant.

The upper limit may be an integer multiple of the amount of credit allocated to a bearer in one time interval.

In any time interval, for which resources are available, each bearer may be served at its minimum data rate in preference to bearers using carried forward credit.

The mobile communication system may be a universal mobile telecommunication system.

In accordance with a second aspect, a method of controlling allocation of resources in a terminal of a communication system includes signalling from a network control entity to a mobile device, a time period; and using the time period in a method according to the first aspect.

A timer is transferred to the mobile device, typically a UE, for use in regulating the achievement of meeting minimum bit rates, although if the UE sets its own internal timer, then credits can be used without additional signalling.

The timer value may be transferred to the UE across the radio interface in radio resource control signalling sent by the network, or the timer is set internally in the UE to a specified value.

For example, the timer may be sent by the base station (eNB in UMTS LTE), or the timer may be set to a value specified in a related standardization specification.

The timer may be used within the UE to ensure that it meets minimum bit rate and/or maximum bit rate criteria set for the bearer.

The timer may be used in a UE test regime as a measure of the interval in which the UE must meet the minimum and/or maximum bit rates set for the bearer.

The mobile device may be a terminal of the communication system, or a testing entity used to verify the operation of the terminal.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
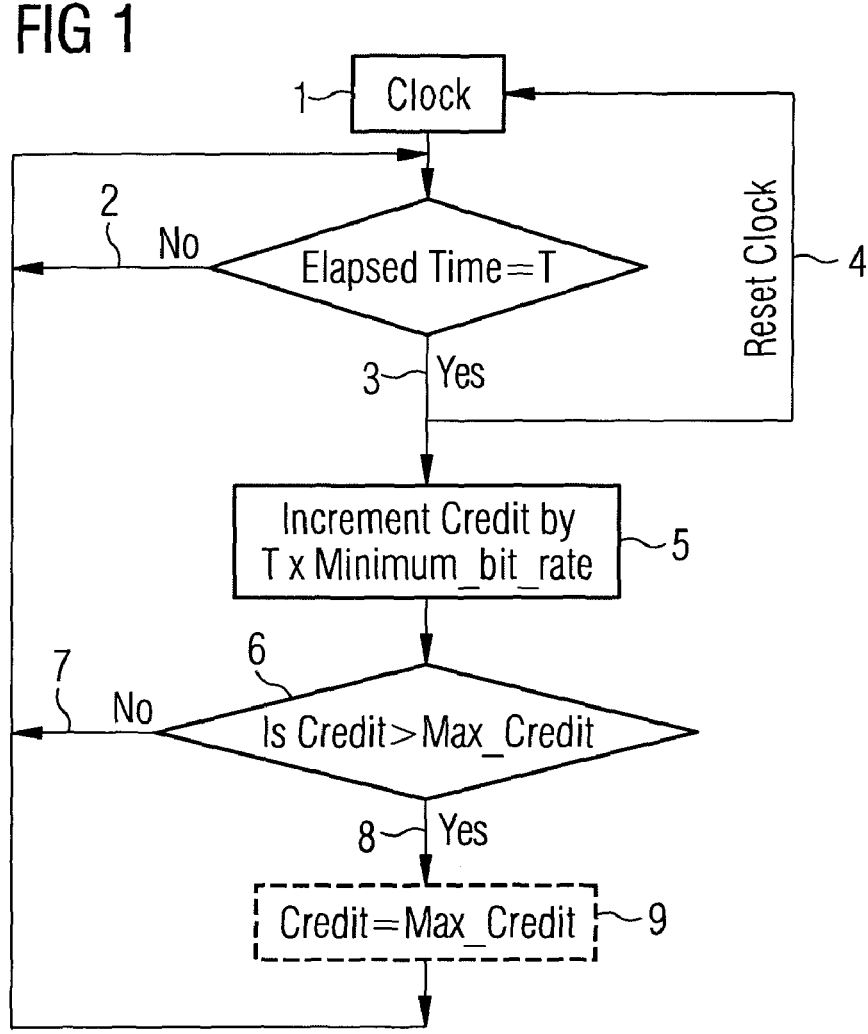
FIG. 1 is a flowchart of how a timer T can be used to increment credits that are subsequently used in the scheduler.

Reference will now be made in detail to the preferred embodiments, examples of which are illustrated in the accompanying drawings, wherein like reference numerals refer to like elements throughout.

The method enables flexible and minimum bit-rate criteria can be implemented as follows. In each time period, T, which may be larger than or equal to a TTI, the scheduler assigns to each bearer, credits, which are equivalent to the minimum bit-rate associated with the bearer for the period T. The assignment can be added to any positive or negative credits carried forward from previous time intervals.

As shown in FIG. 1, credits in a scheduler are controlled using a timer. A clock 1 is started, which continues whilst an elapsed time T is not exceeded 2. When the elapsed time is exceeded 3, the clock is reset 4 and a credit is incremented 5 by T×the minimum bit rate. A check is made as to whether the accumulated credit has reached 6 a maximum credit. If the credit has not exceeded 7 the maximum, the timer and incrementing steps continue, if the credit is equal 8 to the maximum credit, the checking stops 9.

Figure 2:
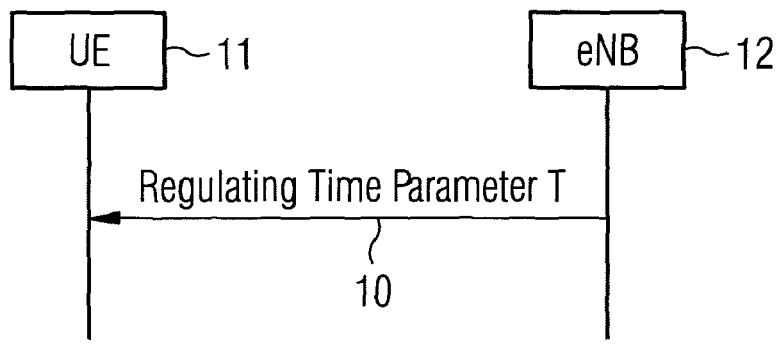
FIG. 2 is a block diagram of a time value T being delivered from the network to the UE; and, FIG. 3 is a flowchart of a scheduler using credits to decide how much of an allocated grant is assigned to a bearer in a scheduling period.

In the method, there is signalling from a cellular network, e.g. from a base station or a network control entity, to a mobile device e.g. a 3GPP LTE UE, of a time period, here called T. The regulating time parameter T is sent in a message 10 to the UE 11 by the eNode B 12, as illustrated in FIG. 2.

The flow diagram of FIG. 3 illustrates the method in more detail. A grant is received 20 for a transmission period and initially the available grant is equal to the grant. For each bearer, in priority order 21, a check is made 22 as to whether the credit is greater than 0. If not 23, then checks continue, if the credit is 24 greater than 0, then a check 25 is made as to whether the data buffer is non-empty. If not 26, the checks 21 continue, if the data buffer is 27 non-empty, then a check 28 is made as to whether the grant is less than or equal to the credit. If the grant is 29 less than the credit, then a check 30 is made as to whether the grant is less than or equal to the buffer. If not 31, then 32 add buffer to transmit block, reduce available grant by buffer and reduce credit by buffer. If the available grant is 33 less than or equal to the buffer, then 34 fill the transmit block from the buffer by the available grant and reduce the credit by the available grant.

Where the available grant is not 35 less than or equal to the credit, a check 36 is made of whether the credit is less than or equal to the buffer. If not 37, then 38 add the buffer to the transmit block, reduce the available grant by the buffer and reduce the credit by the buffer. If the credit is 39 less than or equal to the buffer, then add from the buffer to the transmit block to the value of the credit incremented and if necessary, up to the next SDU boundary, provided that this does not exceed the credit by more than a specified margin, or exceed the available grant; decrement the credit by the size of the included data, and decrement the available grant by the size of the included data. Then return to the check stage 21. In both cases where the buffer is added to the transmit block, the checking cycle 21 continues.

In each TTI for which the scheduler has resources available, the scheduler takes data from that bearer which has highest priority, a non-empty transmission buffer and positive credit. Accepting data from a bearer reduces its credit by an amount that is equivalent to the volume of data transmitted. This mechanism ensures that if data arrives for a higher priority bearer that has positive credit within the TTI, then the data on the higher priority bearer will be served in the next TTI.

Unused minimum capacity credit can be added to the credit assigned in the next time interval T i.e. carried forward. To prevent carried forward credit resulting in temporary starvation of lower priority bearers, then an upper limit is set for carry forward credit e.g. not more than 'r' times the capacity assigned to the bearer in interval T. Alternatively, all minimum capacity for time T is served before carry forward capacity.

If all bearers with a minimum bit rate credit assignment have either zero credits or empty buffers then any available resources are assigned to bearers so as to fulfill the criteria that are to apply when the minimum capacity requirements have been met.

In the method, when accepting data from a bearer in step 2 above, the scheduler accepts a larger packet than the bearer's minimum credit would allow, resulting in the bearer's credit becoming negative. This can be done if, for example, it is efficient to do so from a radio point of view, e.g. if it avoids segmenting the packet.

The negative credit that results may be carried forward into the next time period T. An upper limit may be set on the excess credit permitted, for example, not greater than that to be assigned in 'n' intervals T.

Thus the time interval T forms a basis for ensuring that the resource allocation function in the UE meets the minimum bit-rate criteria that it is required to implement. Similar procedures can be used to ensure that the resource allocation function does not exceed a maximum bit-rate requirement for a particular bearer. If the mobile network defines the time interval T that is to be used within the UE then a consistent behavior is possible for each UE.

Signalling of the time period, T to the UE allows the UE to control the allocation of resources to particular bearers, so that it can ensure that target minimum bit rates are achieved before resources are used for other purposes e.g. via a credit system similar to that described above; or enables the UE to control the allocation of resources to particular bearers so that it can ensure that target maximum bit rates are not exceeded e.g. via a credit system similar to that described above. Alternatively, the time period is signalled to and used by a testing entity to verify that the UE has met the requirements placed on it to ensure resources are allocated in the way that the network has specified.

The network can set a guaranteed bit rate and notify the UE of this, then the UE indicates what buffer space it has available, without specifying the priority level of this. A percentage permitted overload for any service that has a minimum guaranteed bit rate can be signalled as part of the bearer parameters during radio bearer configuration. The method is UE specific, so when a service is set up, a suitable bearer is set up, e.g. VOIP for voice, during the configuration stage. Any background data only gets best efforts service, but no minimum bit rate guarantee.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of scheduling packets in a mobile communication system, comprising:

assigning a positive credit to each bearer of a terminal in each time period for which resources are available; and accepting data packets from a bearer in accordance with predefined constraints of priority, buffer content and credit, where the data packets accepted include a data packet having a size that exceeds an available credit by an amount in a predefined range, and wherein, when accepting data from the bearer, the credit of the bearer is reduced by the size of the accepted data packet, and when the size of the accepted data packet exceeds the credit of the bearer, an amount by which the credit is exceeded is carried forward to a next time period as a negative credit, and a credit to be assigned to the bearer in the next time period is added to the negative credit carried forward.

2. A method according to claim 1, wherein the predefined constraints are for a highest priority, non-empty buffer and positive credit.

3. A method according to claim 2, further comprising adding the buffer content to a data block for transmission to one of a limit of the credit and a next service data unit boundary, if the bearer satisfies the predefined constraints.

4. A method according to claim 3, wherein the predefined range is set to accommodate un-segmented packets.

5. A method according to claim 4, further comprising carrying forward, any amount by which the credit is exceeded, to the next time interval as a negative credit.

6. A method according to claim 5, further comprising carrying forward, any amount by which the credit is unused, to the next time interval as a positive credit.

7. A method according to claim 6, wherein an upper limit is set for carried forward positive and negative credit.

8. A method according to claim 7, wherein the upper limit is an integer multiple of an amount of credit allocated to a bearer in one time interval.

9. A method according claim 8, further comprising serving, in any time interval for which resources are available, each bearer at a minimum data rate thereof in preference to bearers using carried forward credit.

10. A method according to claim 9, wherein the mobile communication system is a universal mobile telecommunication system.

11. A method according to claim 5, wherein an upper limit is set for carried forward negative credit.

12. A method according to claim 11, wherein the upper limit is an integer multiple of an amount of credit allocated to a bearer in one time interval.

13. A method of controlling allocation of resources in a mobile device of a communication system, comprising:

signalling from a network control entity to the mobile device a time period and using the time period, including a positive credit for each bearer of a plurality of terminals in each time period for which resources are available; and accepting data packets from the mobile device in accordance with predefined constraints of priority, buffer content and credit, where the data packets accepted include a data packet having a size that exceeds an available credit by an amount in a predefined range, and wherein, when accepting data from the bearer, the credit of the bearer is reduced by the size of the accepted data packet, and when the size of the accepted data packet exceeds the credit of the bearer, an amount by which the credit is exceeded is carried forward to a next time period as a negative credit, and a credit to be assigned to the bearer in the next time period is added to the negative credit carried forward.

14. A method according to claim 13, wherein the mobile device is one of the terminals of the communication system, or a testing entity used to verify operation of the terminals.

15. A method according to claim 13, further comprising one of transferring a timer value to the mobile device across a radio interface in radio resource control signaling sent by the network control entity, or setting the timer value internally in the mobile device to a specified value.

16. A method according to claim 13, further comprising using a timer within the mobile device to ensure that the mobile device meets minimum bit rate and/ or maximum bit rate criteria set for each bearer.

17. A method according to claim 16, further comprising using the timer in a mobile device test regime as a measure of the interval in which the mobile device must meet the minimum and/ or maximum bit rates set for each bearer.

18. A method according to claim 1, wherein the data packets from the bearer are transmitted having the size that exceeds the available credit by the amount in the predefined range.

* * * * *